US012755740B2

(12) United States Patent
Sung et al.

(10) Patent No.: US 12,755,740 B2
(45) Date of Patent: Oct. 6, 2026

(54) AUDIO SIGNAL PROCESSING APPARATUS AND METHOD FOR DEEP NEURAL NETWORK-BASED AUDIO ENCODER AND DECODER

(71) Applicants: ELECTRONICS AND TELECOMMUNICATIONS RESEARCH INSTITUTE, Daejeon (KR); INDUSTRY-ACADEMIC COOPERATION FOUNDATION, YONSEI UNIVERSITY, Seoul (KR)

(72) Inventors: Jong Mo Sung, Daejeon (KR); Seung Kwon Beack, Daejeon (KR); Young Cheol Park, Wonju-si (KR); Joon Byun, Wonju-si (KR); Seung Min Shin, Wonju-si (KR)

(73) Assignees: ELECTRONICS AND TELECOMMUNICATIONS RESEARCH INSTITUTE, Daejeon (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 223 days.

(21) Appl. No.: 18/505,970

(22) Filed: Nov. 9, 2023

(65) Prior Publication Data

US 2024/0169997 A1 May 23, 2024

(30) Foreign Application Priority Data

Nov. 10, 2022 (KR) ........................ 10-2022-0149392

(51) Int. Cl.
*G10L 19/005* (2013.01)

(52) U.S. Cl.
CPC .................................. *G10L 19/005* (2013.01)

(58) Field of Classification Search
CPC ..................................................... G10L 19/005
See application file for complete search history.

(56) References Cited

U.S. PATENT DOCUMENTS 12,266,375 B2 * 4/2025 Lecomte ................. G10L 19/20
12,299,896 B1 * 5/2025 Feng ........................ G06T 11/00
(Continued)

FOREIGN PATENT DOCUMENTS

KR 10-2019-0060628 A 6/2019
KR 10-2021-0096542 A 8/2021

OTHER PUBLICATIONS

Zhen, K., Sung, J., Lee, M. S., Beack, S., & Kim, M. (2021). Scalable and efficient neural speech coding: A hybrid design. IEEE/ACM Transactions on Audio, Speech, and Language Processing, 30, 12-25.*

(Continued)

*Primary Examiner* — Bryan S Blankenagel

(57) ABSTRACT

An audio signal processing method, which is executed by a processor electronically communicating with a deep neural network within a computing system, may comprise: acquiring, by the processor, an input signal before encoding and an output signal after quantization and decoding; calculating, by the processor, a perceptual global loss for a frame corresponding to the input and the output signals; acquiring, by the processor, a plurality of subframes corresponding to the input and output signals by applying a windowing function to the frame of the input and output signals; calculating, by the processor, perceptual local losses for the plurality of subframes corresponding to the input and output signals; and acquiring, by the processor, multi-time scale perceptual loss based on the perceptual global and local losses.

18 Claims, 7 Drawing Sheets

(56) References Cited

U.S. PATENT DOCUMENTS

| | | | | |
|---|---|---|---|---|
| 2019/0164052 | A1 | 5/2019 | Sung et al. | |
| 2021/0082444 | A1* | 3/2021 | Fejgin | G10L 19/022 |
| 2021/0233547 | A1 | 7/2021 | Lee et al. | |

OTHER PUBLICATIONS

Adavanne, S. H. A. R. A. T. H. (2020). Sound event localization, detection, and tracking by deep neural networks. Tampere University.*

Joon Byun et al., "Development of a Psychoacoustic Loss Function for the Deep Neural Network (DNN)-Based Speech Coder," Interspeech 2021, ISCA, 2021.

Seungmin Shin et al., "Deep Neural Network (DNN) Audio Coder Using a Perceptually Improved Training Method," IEEE, ICASSP, 2022.

Srihari Kankanahalli, "End-To-End Optimized Speech Coding With Deep Neural Networks," IEEE, ICASSP, 2018.

Seung-Min Shin et al., "Optimization of Multi-time Scale Loss Function Suitable for DNN-based Audio Coder," 2022 The Korean Institute of Broadcast and Media Engineers Summer Conference, Jun. 22, 2022.

Joon Byun et al., "Optimization of Deep Neural Network (DNN) Speech Coder Using a Multi Time Scale Perceptual Loss Function," Interspeech, 2022, Sep. 22, 2022.

* cited by examiner

FIG. 6

| Bitrate (kbps) | SNR (dB) | | | | PESQ-WB | | | |
|---|---|---|---|---|---|---|---|---|
| | AMR-WB | OPUS | Model in [9] | Proposed | AMR-WB | OPUS | Model in [9] | Proposed |
| ~9 | 9.75 | 8.11 | 13.91 | 14.52 | 3.365 | 3.305 | 3.631 | 3.791 |
| ~13 | 11.31 | 9.69 | 15.88 | 16.49 | 3.771 | 4.010 | 3.932 | 4.107 |
| ~20 | 12.43 | 12.33 | 18.12 | 18.37 | 3.970 | 4.375 | 4.229 | 4.272 |
| ~24 | 12.69 | 13.03 | 18.85 | 19.26 | 3.999 | 4.453 | 4.307 | 4.344 |

AUDIO SIGNAL PROCESSING APPARATUS AND METHOD FOR DEEP NEURAL NETWORK-BASED AUDIO ENCODER AND DECODER

CROSS-REFERENCE TO RELATED APPLICATION

This application claims priority to Korean Patent Application No. 10-2022-0149392, filed on Nov. 10, 2022, with the Korean Intellectual Property Office (KIPO), the entire contents of which are hereby incorporated by reference.

BACKGROUND

1. Technical Field

The present disclosure relates to an audio signal processing apparatus and method for a deep neural network-based audio encoder and decoder, and particularly to, an audio signal processing technique for the training of a deep neural network-based audio encoder and decoder.

2. Related Art

The content presented in this section serves solely as background information for the embodiments and does not represent any conventional technology.

With the advancement of multimedia, efficient encoding technologies for storage and communication on large-capacity media have become increasingly important. In recent times, alongside the development of artificial intelligence, research on deep neural network-based audio encoders and decoders is also underway, and compared to traditional methods, data-driven approaches have demonstrated superior performance and potential. However, there is still active research on network architectures and training methods to achieve good performance not only based on objective metrics but also through subjective listening evaluations.

In previous studies on speech processing applications, methods for designing loss functions for neural network training have been employed, taking into account the human auditory model. In the case of speech signals, perceptual performance metrics such as short-time objective intelligibility (STOI) and perceptual assessment of speech quality (PESQ) have been adopted for the design of loss functions. In audio and speech coding, several methods have been proposed to conceal quantization noise below the global masking threshold (GMT) for frequencies perceptible to humans by utilizing psychoacoustic models (PAM).

However, in audio and speech encoders and decoders designed by controlling Rate-Distortion criterion, although it is possible to conceal quantization noise while maintaining audio quality by utilizing psychoacoustic models, additional research is still needed to achieve perceptual transparency.

SUMMARY

It is an object of the present disclosure to provide an audio signal processing technique for the training of deep neural network-based audio encoders and decoders to enhance the perceptual quality of the deep neural network-based audio encoder and decoder.

It is still another object of the present disclosure to provide a technique for establishing a loss function associated with the training process of deep neural network-based audio encoders and decoders to enhance the perceptual quality of the deep neural network-based audio encoders and decoders.

According to a first exemplary embodiment of the present disclosure, an audio signal processing method executed by a processor electronically communicating with a deep neural network within a computing system, method may comprise: acquiring, by the processor, an input signal before encoding and an output signal after quantization and decoding; calculating, by the processor, a perceptual global loss for a frame corresponding to the input and the output signals; acquiring, by the processor, a plurality of subframes corresponding to the input and output signals by applying a windowing function to the frame of the input and output signals; calculating, by the processor, perceptual local losses for the plurality of subframes corresponding to the input and output signals; and acquiring, by the processor, multi-time scale perceptual loss based on the perceptual global and local losses.

The method may further comprise controlling, by the processor, an encoder based on the deep neural network to encode the input signal.

The method may further comprise: quantizing, by the processor, the encoded signal; and controlling, by the processor, a decoder based on a second deep neural network to decode the quantized signal.

The controlling of the encoder may comprise: controlling, by the processor, the encoder to pass the input signal through a first gated linear unit (GLU) block within the encoder; downsampling, by the processor, the signal passed through the first GLU block; and controlling, by the processor, the encoder to pass the downsampled signal through a second GLU block; and controlling, by the processor, the encoder to generate a latent vector through a first long-short term memory (LSTM) block based on the signal passed through the second GLU block.

The controlling of the decoder may comprise: controlling, by the processor, the decoder to pass the quantized signal through a second long-short term memory (LSTM) block within the decoder; controlling, by the processor, the decoder to pass the signal passed through the second LSTM block through a third GLU block; upsampling, by the processor, the signal passed through the third GLU block; and controlling, by the processor, the decoder to generate the output signal through a fourth GLU block based on the upsampled signal.

The quantizing of the encoded signal may comprise performing, by the processor, the quantization by applying a differentiable quantization technique to the encoded signal.

The method may further comprise calculating, by the processor, a total loss by applying at least one of a mean squared error (MSE) loss function, a log-mel spectrum (LMS) loss function, and the multi-time scale perceptual loss.

The acquiring of the multi-time scale perceptual loss may comprise acquiring the multi-time scale perceptual loss using a weighted sum of the perceptual global and local losses.

The calculating of the perceptual global loss may comprise acquiring, by the processor, the perceptual global loss by inputting the frame corresponding to the input and output signals to a loss function calculation module. The calculating of the perceptual local losses may comprise acquiring, by the processor, the perceptual local losses by inputting the plurality of subframes corresponding to the input and output signals to the loss function calculation module.

The calculating of the total loss may comprise applying a loss function calculation module comprising a weighted sum of the perceptual global loss and the perceptual local losses, wherein the loss function calculation module may further comprise a weighted sum including at least one of a loss term for controlling a bit rate using entropy, or mean squared error loss terms.

According to a second exemplary embodiment of the present disclosure, an audio signal processing apparatus may comprise: a processor electronically communicating with a deep neural network, wherein the processor is configured to: acquire an input signal before encoding and an output signal after quantization and decoding; calculate a perceptual global loss for a frame corresponding to the input and the output signals; acquire a plurality of subframes corresponding to the input and output signals by applying a windowing function to the frame of the input and output signals; calculate perceptual local losses for the plurality of subframes corresponding to the input and output signals; and acquire multi-time scale perceptual loss based on the perceptual global and local losses.

The processor may control an encoder based on the deep neural network to encode the input signal.

The processor may quantize the encoded signal and may control a decoder based on a second deep neural network to decode the quantized signal.

The processor may control the encoder to pass the input signal through a first gated linear unit (GLU) block within the encoder; downsample the signal passed through the first GLU block; control the encoder to pass the downsampled signal through a second GLU block; and control the encoder to generate a latent vector through a first long-short term memory (LSTM) block based on the signal passed through the second GLU block.

The processor may control the decoder to pass the quantized signal through a second long-short term memory (LSTM) block within the decoder; control the decoder to pass the signal passed through the second LSTM block through a third GLU block; upsample the signal passed through the third GLU block; and control the decoder to generate the output signal through a fourth GLU block based on the upsampled signal.

The processor may perform the quantization by applying a differentiable quantization technique to the encoded signal.

The processor may calculate a total loss by applying at least one of a mean squared error (MSE) loss function, a log-mel spectrum (LMS) loss function, and the multi-time scale perceptual loss.

The processor may acquire the multi-time scale perceptual loss using a weighted sum of the perceptual global and local losses.

The processor may acquire the perceptual global loss by inputting the frame corresponding to the input and output signals to a loss function calculation module; and may acquire the perceptual local losses by inputting the plurality of subframes corresponding to the input and output signals to the loss function calculation module.

The processor may apply a loss function calculation module comprising a weighted sum of the perceptual global loss and the perceptual local losses, wherein the loss function calculation module may further comprise a weighted sum including at least one of a loss term for controlling a bit rate using entropy, or mean squared error loss terms.

BRIEF DESCRIPTION OF DRAWINGS

FIG. 6 is a table showing objective performance metrics achieved by the deep neural network-based audio encoder according to an embodiment of the present disclosure.

DETAILED DESCRIPTION OF THE EMBODIMENTS

Figure 1:
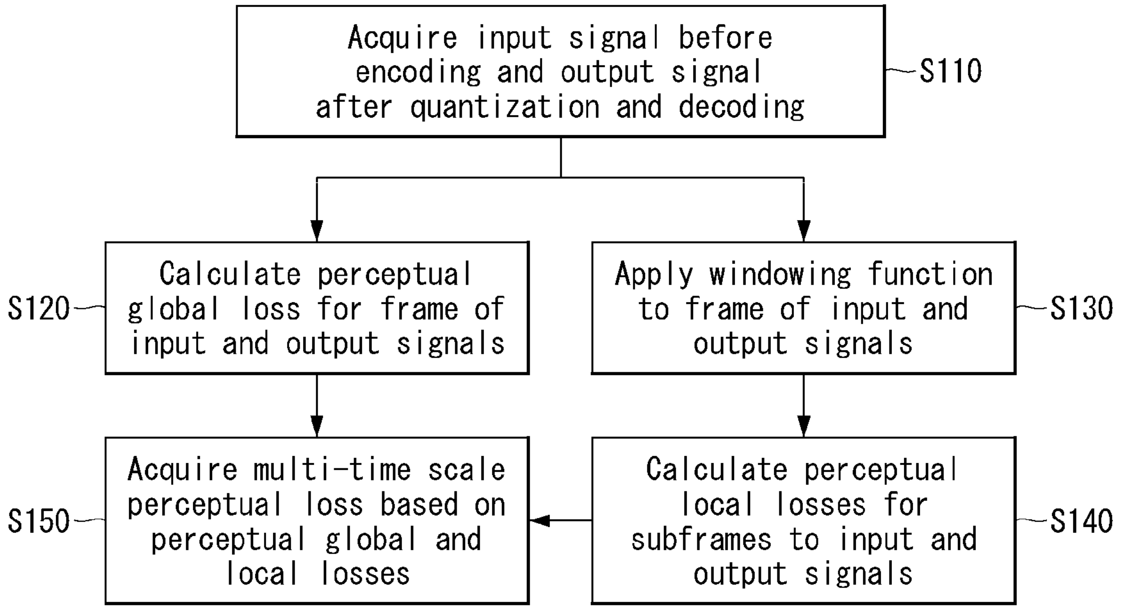
FIG. 1 is a flowchart illustrating an audio signal processing method for calculating perceptual global and local losses according to an embodiment of the present disclosure.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term “and/or” includes any and all combinations of one or more of the associated listed items.

In exemplary embodiments of the present disclosure, “at least one of A and B” may refer to “at least one A or B” or “at least one of one or more combinations of A and B”. In addition, “one or more of A and B” may refer to “one or more of A or B” or “one or more of one or more combinations of A and B”.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., “between” versus “directly between,” “adjacent” versus “directly adjacent,” etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, even a technology known before the filing date of the present application may be included as a part of the configuration of the present disclosure when necessary, and will be described herein without obscuring the spirit of the present disclosure. However, in describing the configuration of the present disclosure, the detailed description of a technology known before the filing date of the present application that those of ordinary skill in the art can clearly understand may obscure the spirit of the present disclosure, and thus a detailed description of the related art will be omitted.

For example, technologies involving the processing of audio signals using psychoacoustic models (PAM) and techniques for implementing deep neural networks and the like may be employed as technologies known prior to the filing of this application, and at least part of these known technologies may be applied as essential elements for implementing the present disclosure.

However, the present disclosure does not intend to claim rights over these known technologies, and the contents of these known technologies may be incorporated as part of the present disclosure within the scope that aligns with the purpose of the present disclosure.

Hereinafter, preferred embodiments of the present disclosure are described with reference to the accompanying drawings in detail. In order to facilitate a comprehensive understanding of the present disclosure, the same reference numerals are used for identical components in the drawings, and redundant explanations for the same components are omitted.

FIG. 1 is a flowchart illustrating an audio signal processing method for calculating perceptual global and local losses according to an embodiment of the present disclosure.

An audio signal processing method according to an embodiment of the present disclosure may be executed by the processor within a computing system, the processor electronically communicating with a deep neural network model.

With reference to FIG. 1, the audio signal processing method for calculating perceptual global and local losses according to one embodiment of the present disclosure includes acquiring, by the processor, the input signal at step S110 before encoding and the output signal after quantization and decoding, calculating the perceptual global loss for the analysis target frames of the input and output signals at step S120, applying a windowing function to the frames of the input and output signals at step S130 to obtain a plurality of subframes, calculating the perceptual local loss for each of the plurality of subframes of the input and output signals at step S140, and acquiring the multi-time scale perceptual loss based on the perceptual global and local losses at step S150.

The audio signal processing method for calculating perceptual global and local losses according to an embodiment of the present disclosure may further include controlling, by the processor, a decoder based on a deep neural network to perform encoding and decoding on the input signal.

The audio signal processing method for calculating perceptual global and local losses according to one embodiment of the present disclosure may further include performing, by the processor, quantization on the encoded signal and controlling the decoder based on a second deep neural network, other than the deep neural network corresponding to the encoder, to perform decoding on the quantized signal.

Figure 3:
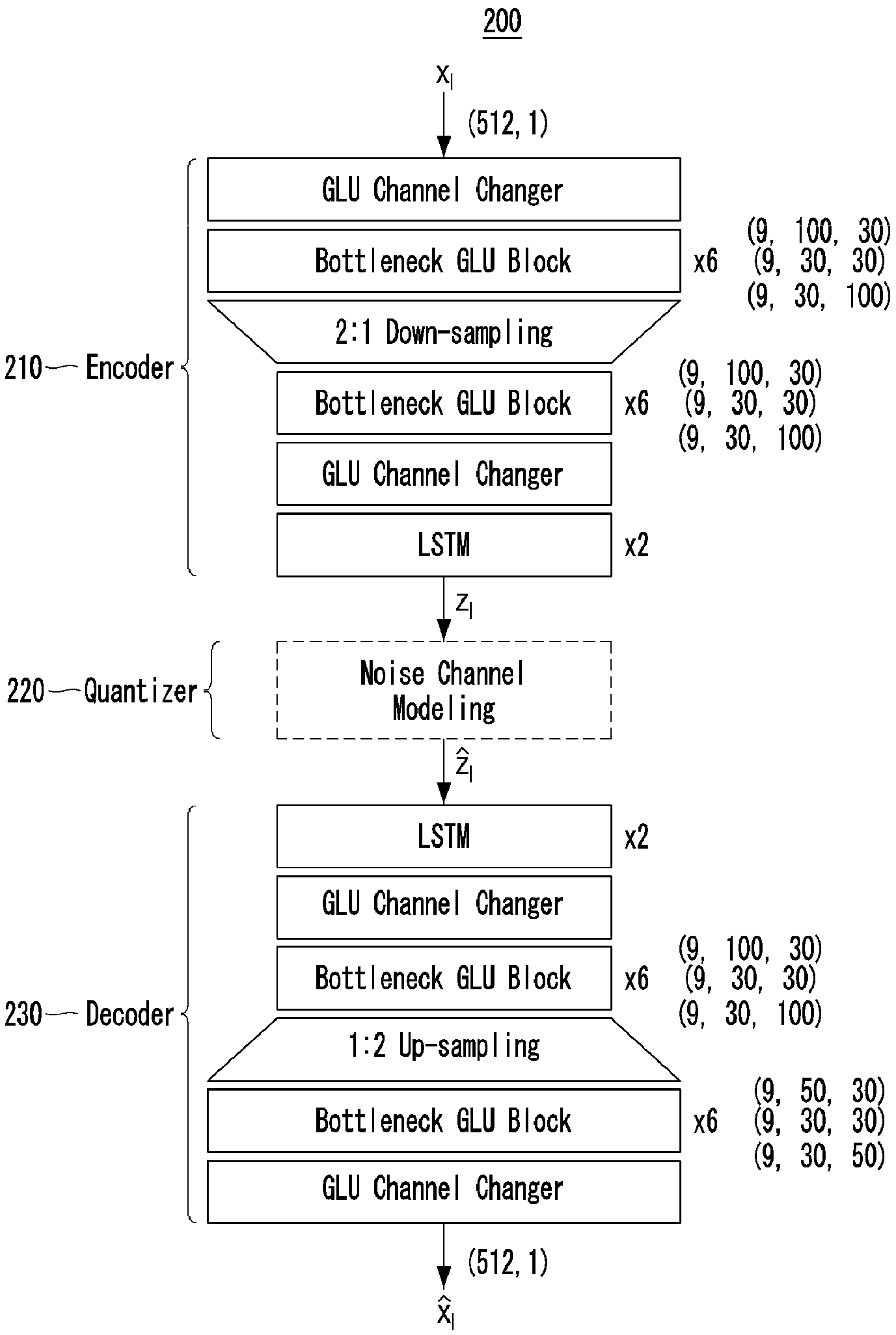
FIG. 3 is a block diagram illustrating a deep neural network-based audio encoder and decoder according to an embodiment of the present disclosure.

The controlling of the encoder may include controlling, by the processor, the encoder to pass the input signal through a first gated linear unit (GLU) block within the encoder, downsample the signal passed through the first GLU block, pass the downsampled signal through a second GLU block, and generate a latent vector through a long short-term memory (LSTM) block based on the signal passed through the second GLU block. As shown in FIG. 3, the first GLU block may include at least a bottleneck GLU block and further include a GLU channel changer before a 2:1 downsampling block. As shown in FIG. 3, the second GLU block may include at least a bottleneck GLU block and may further include a GLU channel changer after the downsampling block.

The controlling of the decoder may include controlling, by the processor, the decoder to pass the quantized signal through a second LSTM block within the decoder, pass the signal passed through the second LSTM block through a third GLU block, upsample the signal passed through the third GLU block, and generate the output signal through a fourth GLU block based on the upsampled signal. As shown in FIG. 3, the third GLU block may include at least a bottleneck GLU block and may further include a GLU channel changer before a 1:2 upsampling block. As shown in FIG. 3, the fourth GLU block may include at least a bottleneck GLU block and may further include a GLU channel changer after the upsampling block.

The performing of quantization may include applying, by the processor, a differentiable quantization technique to the encoded signal.

According to an embodiment of the present disclosure, the audio signal processing method may further include calculating an overall (total) loss function for training a deep neural network-based audio encoder and decoder, in addition to calculating perceptual global and local losses. In this case, at least one of the Mean Squared Error (MSE) loss function or the Log-Mel Spectrum (LMS) loss function may be applied as the additional loss function.

In at least one of calculating perceptual global loss and calculating perceptual local loss, a signal processing technique capable of concealing quantization noise below the Global Masking Threshold (GMT) corresponding to the audibility threshold curves based on frequency using a Psychoacoustic Model (PAM) may be employed.

In calculating perceptual global loss, the processor may input the input signal and the output signal to a perceptual loss calculation module on a frame-by-frame basis to obtain perceptual global loss. In calculating perceptual local loss, the processor may obtain perceptual local loss for each of the multiple subframes of the input signal and the output signal.

In at least part of calculating the total loss, the perceptual loss calculation module may include a weighted sum of perceptual global loss and perceptual local losses, and it may further include a weighted sum of at least one of a loss term for controlling the bit rate using the entropy obtained through a separate loss calculation module and/or a mean squared error loss term.

Figure 2:
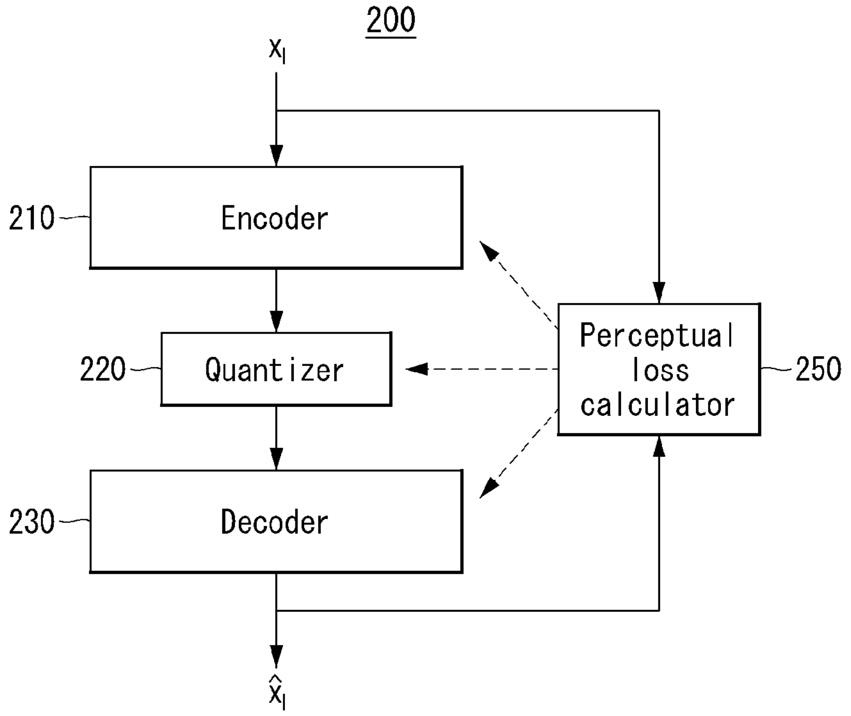
FIG. 2 is a conceptual diagram illustrating an end-to-end learning process for training a deep neural network-based audio encoder and decoder using a perceptual loss function according to an embodiment of the present disclosure.

FIG. 2 is a conceptual diagram illustrating an end-to-end learning process for training a deep neural network-based audio encoder and decoder using a perceptual loss function according to an embodiment of the present disclosure.

With reference to FIG. 2, the input signal is input to the encoder 210, the signal passed through the encoder 210 is transferred to the quantizer 220, and the signal passed through the quantizer 220 may be generated as an output signal through the decoder 230.

In this case, the encoder 210 may be implemented using a deep neural network (DNN). The encoder 210 may be controlled by a processor electronically connected to the deep neural network and may perform encoding on the input signal.

As a learning method to enhance the quality of the deep neural network-based audio encoder and decoder 210 and 230 and quantizer 220, loss function-based end-to-end learning may be employed. The learning may be carried out in a direction to minimize the difference between the output signal of the decoder 230, which is deteriorated due to the incomplete model structure of the encoder 220 and decoder 230 and the quantization process of the quantizer for encoded signal transfer, and the original input signal.

Typically, the conventional research on deep neural networks with autoencoder structures, which are widely used in signal compression, have focused on altering the neural network structure or designing loss functions that utilize fixed global information within a single frame to improve the quality of the decoded output.

In this invention, a method is proposed to enhance the perceptual quality of the final output by effectively concealing noise signals occurring during the actual encoding, quantization, and decoding processes through the design of a multi-time scale perceptual loss function. Considering the difficulty of addressing information that changes momentarily within a frame in the existing deep neural network structure that operates within a fixed single frame, the proposed method divides the analysis into subframe units shorter than the frame length, calculates the multi-time scale losses capable of reflecting the loss changing over time within the frame, and applies the multi-time scale losses to the overall loss function.

This process is carried out by a perceptual loss calculation module 250 in such a way as to calculate the perceptual global loss for each frame of the input signal and the output signal, and simultaneously, output perceptual local functions for each subframe of the input signal and the output signal, which are obtained by applying a windowing function.

The present disclosure is intended to design a loss function that provides superior perceptual quality compared to conventional methods at the same bit rate when designing an encoder and decoder using end-to-end learning with a deep neural network.

The present disclosure is intended to overcome the difficulty posed by the structural characteristics of commonly used autoencoders in adapting to rapidly changing frames, such as transient regions. The present disclosure is intended to implement a loss function for multi-time scale losses that is capable of adapting to changes within a frame.

The present disclosure is intended to provide a technique for designing the audio encoder 210 capable of outperforming existing commercial codecs such as AMR-WB and OPUS in both objective sound quality evaluation, such as Perceptual Evaluation of Sound Quality (PESQ), and subjective sound quality evaluation, such as Multi Stimulus test with Hidden Reference and Anchor (MUSHRA).

The new perceptual loss function proposed in this invention may be applied to speech and audio coding and any deep neural network for improving speech and audio quality. For example, in the case of speech and audio coding, the multi-timescale perceptual loss can be applied to the total loss function for training a deep neural network constituting the encoder 210 and decoder 230 implemented for end-to-end learning including a quantization process, such that the effect of the multi-timescale perceptual loss can be reflected. To accomplish these goals, the autoencoder structure may be configured in various ways, a description is made of the deep neural network-based audio encoder and decoder with an autoencoder structure according to an embodiment with reference to FIG. 3.

FIG. 3 is a block diagram illustrating a deep neural network-based audio encoder and decoder according to an embodiment of the present disclosure.

With reference to FIG. 3, one example of the configuration of an autoencoder using a bottleneck residual skip connection based on a convolution neural network (CNN).

The deep neural network for the audio encoder 210 may be implemented as a one-dimensional CNN-based autoencoder. The encoder 210 and decoder 230 may each be configured as a network based on a Residual Gated Linear Unit (ResGLU) block. Each GLU block is composed of a bottleneck GLU block and a GLU channel changer. Here, the bottleneck GLU block may be composed of six one-dimensional CNN layers with dilation factors of 1, 2, 4, 8, 16, and 32, corresponding to each layer, and the GLU channel changer may be used to modify the channel count of the input or output signals for each GLU block. The quantizer 220 may employ a uniform noise model.

With reference to FIG. 3, the input signal $x_l$ is an input frame of 512 samples and is extended to two dimensional vector represented as (512, 1) by introducing channel dimension due to the characteristics of CNN. This input signal frame may be input to the encoder 210. The l is the frame index.

The input signal frame $x_l$ may pass through the first GLU block of the encoder 210. The signal passed through the first GLU block may be downsampled by 2:1.

The downsampled signal may pass through the second GLU block and then be processed through the first LSTM to generate a latent vector z.

The latent vector generated by the encoder 210 may be quantized by the quantizer 220 using the uniform noise modeling, one of the differentiable quantization techniques that is approximated to be differentiable for end-to-end learning.

The quantized signal $\hat{z}_l$ may be processed through the second LSTM, the third GLU block, the upsampling block, and the fourth GLU block within the decoder 230 to generate the output signal $\hat{x}_l$.

The output signal may be optimized in the rate-distortion category for end-to-end learning of the deep neural network-based audio encoder 210. Typically, rate and distortion have a trade-off relationship.

In this case, the overall loss for use in minimization of the difference between the input signal and the output signal may consist of components such as Mean Squared Error (MSE) loss, Log-mel Spectrum (LMS) loss, and perceptual loss based on the Psychoacoustic Model (PAM), and in the present disclosure, it is proposed to divide the frame into a plurality of short subframes and use subframe-specific local losses to address the difficulty posed by handling noise resulting from momentary changes within a frame, such as transition regions in the case of applying only the global loss as a perceptual loss based on a psychoacoustic model for the entire frame.

Figure 4:
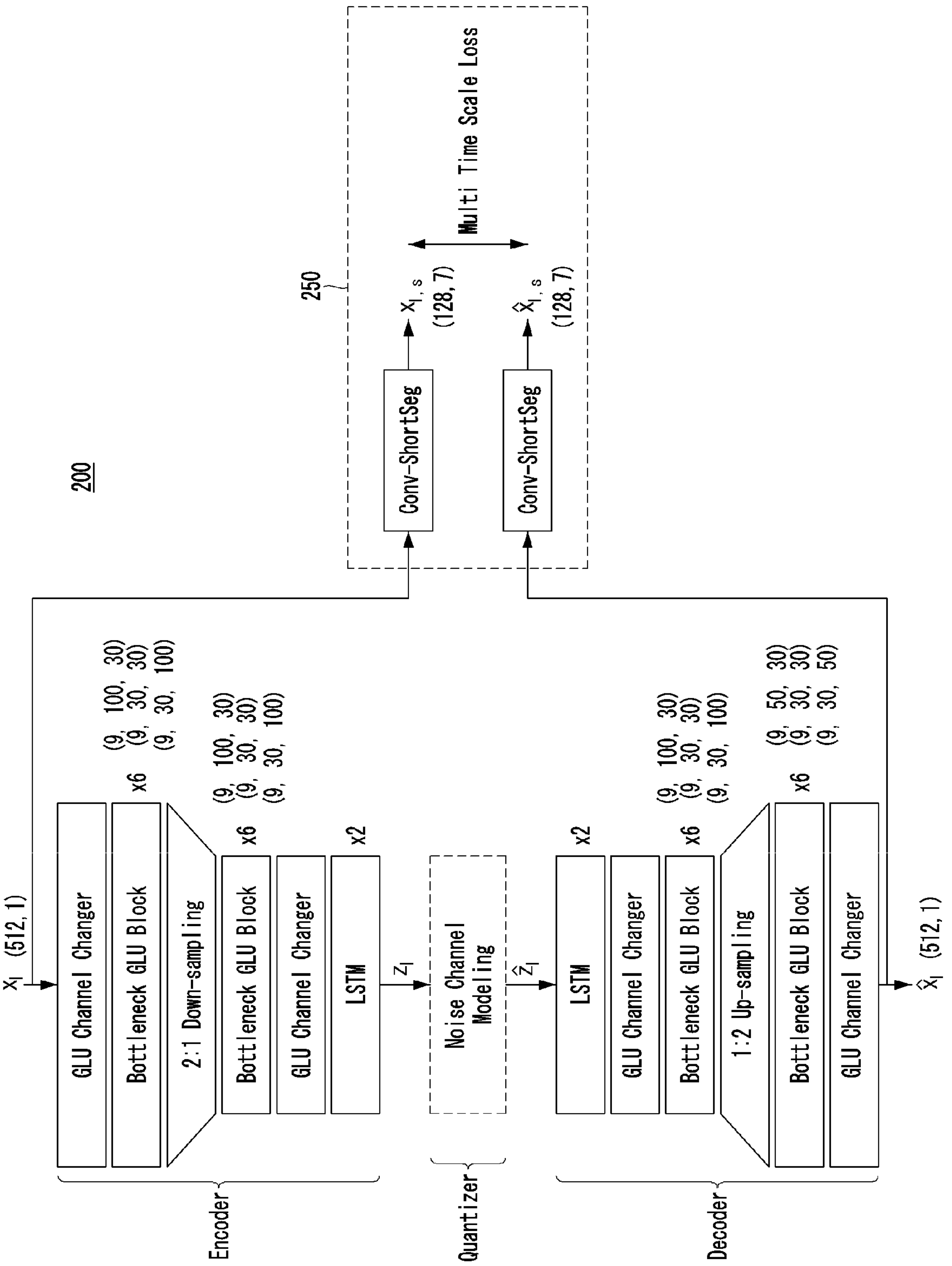
FIG. 4 is a conceptual diagram detailing another part of the process of FIG. 2.

FIG. 4 is a conceptual diagram detailing another part of the process of FIG. 2.

A description is made of the configuration for calculating local losses in the perceptual loss calculation module 250 with reference to FIG. 4. The description of the components of the neural network-based audio encoder and decoder in FIG. 4, which overlaps with FIG. 3, is omitted.

The perceptual local loss is calculated by applying the conventional psychoacoustic model-based perceptual loss calculation method used in the existing perceptual global loss to the subframes obtained through auxiliary CNN layers named Conv-ShortSeg for each of the input signal frame and the output signal frame restored through the decoder 230, within the perceptual loss calculation module 250. According to an embodiment of the present disclosure, Conv-ShortSeg is a layer where the coefficients for the windowing function are pre-fixed in the kernel and are not updated based on the training of the deep neural network. That is, the Conv-ShortSeg layer may be understood as a layer that has the function of performing only a simple filtering. Various functions may be used as windowing functions, the representative ones are hanning, hamming, and sine windows. In this case, the channel size and stride size of the CNN layer may correspond to the window size and hop size required for windowing, respectively.

For example, when the entire input frame consists of 512 samples, the global loss function may be calculated for a single input frame size of 512 samples. In the case of applying only the perceptual global loss using a single input frame, it may be difficult to control localized quantization noise within the frame. Therefore, in an embodiment of the present disclosure, by using both global and local information for a frame size of 512, multi-time scale perceptual loss may be provided. In one embodiment, global information is the frame size of 512 samples, while local information may vary depending on the window size used.

The outputs obtained from Conv-ShortSeg may be subframes of the input signal $x_l$ and the output signal $\hat{x}_l$. For example, with a (512, 1) dimensional input frame $x_l$, applying a subframe window of 128 samples with 50% overlap between adjacent subframes may result in 7 subframes of (128, 1) denoted as $x_{l,s}$, where s=0, . . . , 7 is the subframe index.

In the same manner, the same Conv-ShortSeg may be applied to $x_l$ corresponding to the output signal frame of the decoder 23 to obtain $\hat{x}_{l,s}$ corresponding to the output signal subframe.

The method used to calculate the perceptual global loss may be applied to each subframe in the same way to obtain the perceptual local loss.

Finally, by combining the perceptual global and local losses, the final multi-time scale perceptual loss may be obtained.

In this case, the length of the subframe used to calculate the perceptual local loss may be optimized through experimentation. In one embodiment of the present disclosure, a perceptual local loss term may be calculated for a total of 15 subframes by applying a 64-sample subframe window with a 50% overlap to a frame consisting of 512 samples. In another embodiment, a total of 7 subframes for calculating the perceptual local loss may be obtained by applying a 128-sample subframe window with a 50% overlap to a frame with the same length.

Figure 5:
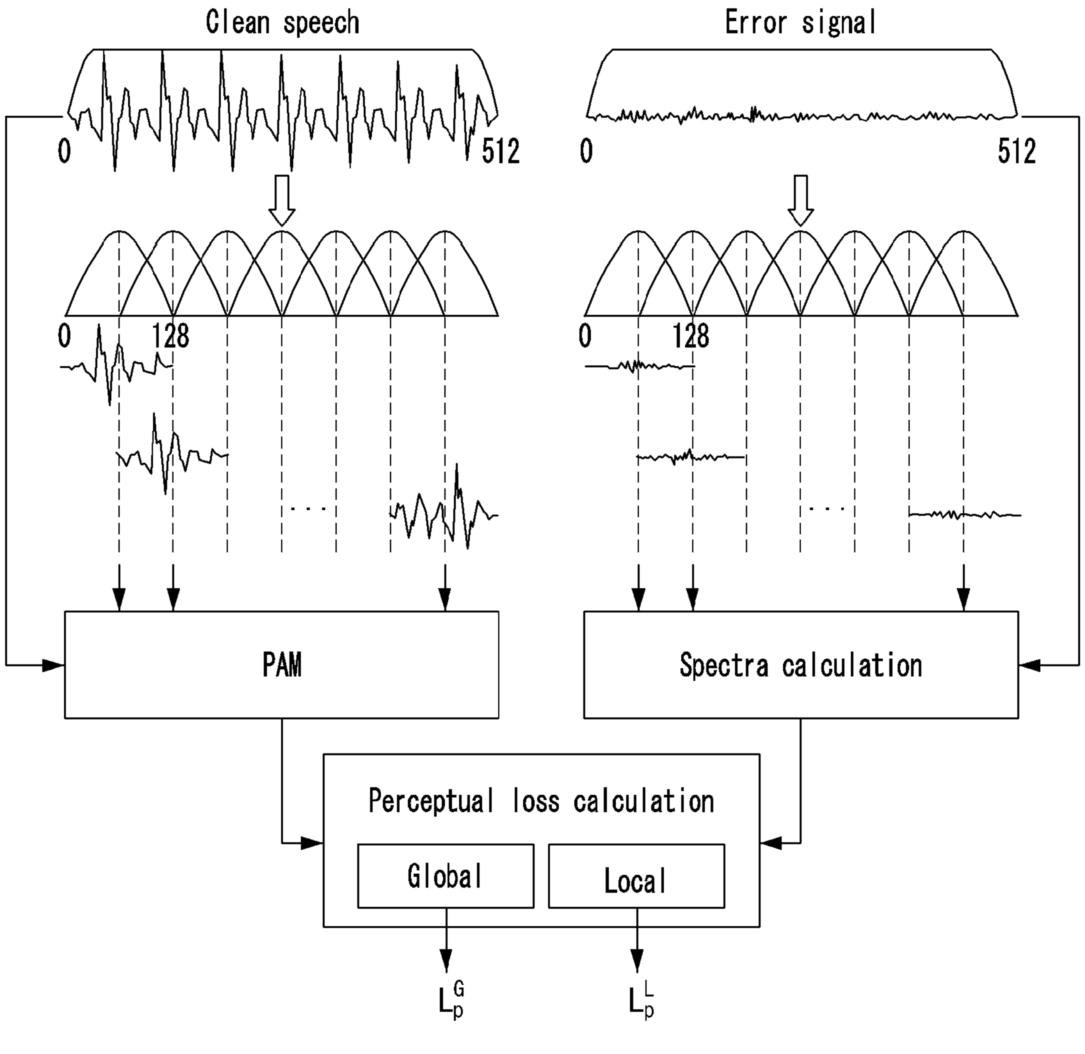
FIG. 5 is a conceptual diagram illustrating a process of calculating multi-time scale perceptual loss as part of the audio signal processing for training a deep neural network-based audio encoder according to an embodiment of the present disclosure.

FIG. 5 is a conceptual diagram illustrating a process of calculating multi-time scale perceptual loss as part of the audio signal processing for training a deep neural network-based audio encoder according to an embodiment of the present disclosure.

With reference to FIG. 5, the perceptual global and local loss may be calculated using the Global Masking Threshold (GMT) calculated through psychoacoustic model (PAM) analysis based on the original input signal, such as Clean Speech, and the frequency spectrum of the error signal corresponding to the difference between the original input signal and the output signal of the decoder 230.

For example, the psychoacoustic model-based perceptual loss may operate in a way to adjust the power of the noise occurring due to the difference between the restored output signal of the deep neural network-based audio encoder and decoder and the original input signal to be less than the global masking threshold (GMT).

To ensure the clarity, the process of calculating perceptual loss may be described in such a way as to explaining the perceptual global loss calculation method, which is performed on a frame basis, and then applying the same method to calculate the perceptual local loss calculated on a subframe basis with variations in frame length.

The process of calculating the psychoacoustic model-based perceptual loss for the given input signal $x_l$ and output signal $\hat{x}_l$ can be summarized as follows.

First, the Fourier transform (FFT) is calculated for each of the input signal frame $x_l$ and output signal frame $\hat{x}_l$ of the deep neural network-based audio encoder and decoder, by Equation 1.

$$X = FFT\{x_l\},\ \hat{X} = FFT\{\hat{x}_l\}, \quad \text{[Equation 1]}$$

where, FFT{·} is fast Fourier transform (FFT), X represents the Fourier transformed coefficients vector of the input signal frame $x_l$, and $\hat{X}$ represents the Fourier transformed coefficients vector of the output signal frame $\hat{x}_l$.

Using X and $\hat{X}$, the power spectrums for the input signal frame and the quantization noise may be calculated by Equation 2.

$$P_x = |X|^2,\ P_e = \left|\hat{X} - X\right|^2, \quad \text{[Equation 2]}$$

where, $P_x$ represents the power spectrum of the input signal, and $P_e$ represents the power spectrum of the quantization noise.

Using the known psychoacoustic model PAM-1, the global masking threshold (GMT) and perceptual entropy (PE) are calculated by Equation 3.

$$T = PAM1\{P_x\} \quad \text{[Equation 3]}$$

$$E = \log_2\left(2\frac{|\Re(x)|}{\sqrt{6T}} + 1\right) + \log_2\left(2\frac{|\Im(x)|}{\sqrt{6T}} + 1\right),$$

Here, T represents GMT, and E represents PE.

In Equation 3, $\Re(\cdot)$ is the operator for taking the real part of a complex number, and $\Im(\cdot)$ is the operator for taking the imaginary part.

Afterwards, the Noise-to-Mask Ratio (NMR) N on a logarithmic scale is calculated by Equation 4 using GMT and PE.

$$N = 10\log_{10}P_e - 10\log_{10}T \quad \text{[Equation 4]}$$

Using N and $\overline{N}$ which is the average value of N, the frequency bands relatively vulnerable to quantization noise are selected, and compensation process is performed on the selected bands as shown in Equation 5.

$$\hat{P}_e = P_e \odot 10^{0.1ReLU\{-S\}} \quad \text{[Equation 5]}$$
$$S = N - \overline{N},\ \overline{N} = \text{mean}\{N\}$$

Here, the ReLU function is the Rectified Linear Unit function, the $\odot$ operator represents element-wise product, and $\hat{P}_e$ represents the power spectrum of the quantization noise compensated for the vulnerable bands.

The compensation value may be calculated as the difference between the log NMR N calculated by Equation 4 and the average of log NMR N.

The calculated value may be transformed into a linear scale by Equation 5 and multiplied with the power spectrum of the quantization noise to obtain the final compensated value.

The power spectrum of the quantization noise, GMT, and PE may each be transformed into the mel-frequency domain, as shown in Equation 6.

$$C_n^e = H_n\hat{P}_e,\ C_n^t = H_nT,\ C_n^{pe} = H_nE,\ n = 1, \ldots, N \quad \text{[Equation 6]}$$

Here, $$C_n^e,\ C_n^t,\ \text{and}\ C_n^{pe}$$

represent signals transformed into the mel-frequency domain for the compensated quantization noise power spectrum ($\hat{P}_e$), GMT (T), and PE (E), respectively, and $H_n$ represents the transformation matrix for converting each power spectrum into the mel-frequency domain.

To ensure that the power of quantization noise is controlled below the GMT, only the terms contributed by quantization noise with values greater than GMT may be summed up for the loss calculation using the ReLU function, as shown in Equation 7.

$$M_n = ReLU\{10\ \log_{10}C_n^e - 10\ \log_{10}C_n^t\},\ n = 1, \ldots, N \quad \text{[Equation 7]}$$

Here, $M_n$ represents the contribution to the perceptual loss caused by quantization noise.

The weight vector $$w_n^{pe}$$

may be determined based on $$C_n^{pe}$$

calculated by Equation 6, as shown in Equation 8.

$$w_n^{pe} = \left(\frac{C_n^{pe}}{\|C_n^{pe}\|_\infty}\right)^\gamma,\ n = 1, \ldots, N \quad \text{[Equation 8]}$$

Here, $\|\cdot\|_\infty$ represents the maximum norm.

The final perceptual global loss may be obtained by combining $M_n$ and the weight vector $$w_n^{pe},$$

as shown in Equation 9.

$$\mathcal{L}_p^G = \frac{1}{N}\sum_{n=1}^{N}\|w_n^{pe} \odot M_n\|_1 \quad \text{[Equation 9]}$$

Here, $$\mathcal{L}_p^G$$

represents the perceptual global loss, and n represents the mel-frequency index.

The perceptual local loss is computed by applying the same process described in Equations 1 to 9 for each subframe and then averaging the subframe-specific perceptual losses as shown in Equation 10.

$$\mathcal{L}_p^L = \frac{1}{N \cdot M}\sum_{m=1}^{M}\sum_{n=1}^{N}\|w_{n,m}^{pe} \odot M_{n,m}\|_1 \quad \text{[Equation 10]}$$

Here, $$\mathcal{L}_p^L$$

represents the perceptual local loss, and m represents the subframe index.

Using only perceptual global loss may not effectively adapt to momentary quantization noise occurring within that frame. To address this, the present disclosure may apply the subframe-specific perceptual local loss $$\mathcal{L}_p^L,$$

calculated using the Conv-ShortSeg in the perceptual loss calculation module 250, as a loss term for training.

In an embodiment of the present disclosure, the weighted sum of the perceptual local loss $$\mathcal{L}_p^L$$

and the perceptual global loss $$\mathcal{L}_p^G$$

may be applied to the loss function for training, allowing for more effective control of quantization noise within that frame compared to conventional techniques.

In an embodiment of the present disclosure, a combined total loss function including other loss terms may be used to train the optimized deep neural network-based audio encoder and decoder using the multi-time scale loss function. This loss function may be used to train the deep neural network for audio encoding and decoding with the audio encoder 210, quantizer 220, and decoder 230 in accordance with an embodiment of the present disclosure.

One of the loss terms that can be incorporated into the loss function in the audio signal processing technique according to an embodiment of the present disclosure may be represented by Equation 11. Equation 11 may represent the mean squared error (MSE) loss term.

$$\mathcal{L}_{MSE} = \mathbb{E}_{x,u}\{\|x_l - \hat{x}_l\|_2^2\} \quad \text{[Equation 11]}$$

Here, $\mathcal{L}_{MSE}$ represents the loss term due to the mean squared error between the input and output signal frames, and $\mathbb{E}_{x,u}\{\cdot\}$ represents the expected value based on the probability distribution of the random noise, u used in the approximated quantizer.

One of the loss terms that can be incorporated into the loss function in the audio signal processing technique according to an embodiment of the present disclosure may be represented by Equation 12. Equation 12 may represent a loss term for controlling the bit rate using entropy.

$$\mathcal{L}_H = \mathbb{E}_{x,u}\{-\log p_{\tilde{y}_l}(\tilde{y}_l)\},\ p_{\tilde{y}_l}(\tilde{y}_l) = \prod_i p_{\tilde{y}_{l,i}}(\tilde{y}_{l,i}) \quad \text{[Equation 12]}$$

Here, $\mathcal{L}_H$ represents the entropy loss term due to vector quantization, $p_{\tilde{y}_l}(\tilde{y}_l)$ represents the probability density function of the quantized latent vector $\tilde{y}_l$ obtained through the approximated quantizer, $\Pi_i$ represents the product operator.

In an audio signal processing technique according to an embodiment of the present disclosure, the final total loss function capable of being used for training the deep neural network may be obtained by combining different loss terms as shown in Equation 13.

$$\mathcal{L}_{Total} = \lambda_1\mathcal{L}_H + (\lambda_2\mathcal{L}_{MSE} + \lambda_3\mathcal{L}_p^G + \lambda_4\mathcal{L}_p^L) \quad \text{[Equation 13]}$$

Here, $\lambda_1$, $\lambda_2$, $\lambda_3$ and $\lambda_4$ may be determined as the weighting factors, taking into account the dynamic range of each loss term.

The training method for a deep neural network-based audio encoder and decoder using the multi-time scale perceptual loss function according to one embodiment of the present disclosure may provide an audio encoder and decoder offering higher quality and clarity under the same conditions compared to when using only the conventional perceptual global loss function. In this case, a design technique for the loss function for the efficient learning of the deep neural network constituting the audio encoder and decoder may be proposed together.

The audio signal processing technique according to an embodiment of the present disclosure may be used to train deep neural networks effectively by replacing the PAM-based perceptual loss function with the multi-time scale perceptual loss function, thereby reducing the occurrence of artifacts caused by quantization noise and ensuring effective operation even at lower bit rates.

Figure 7:
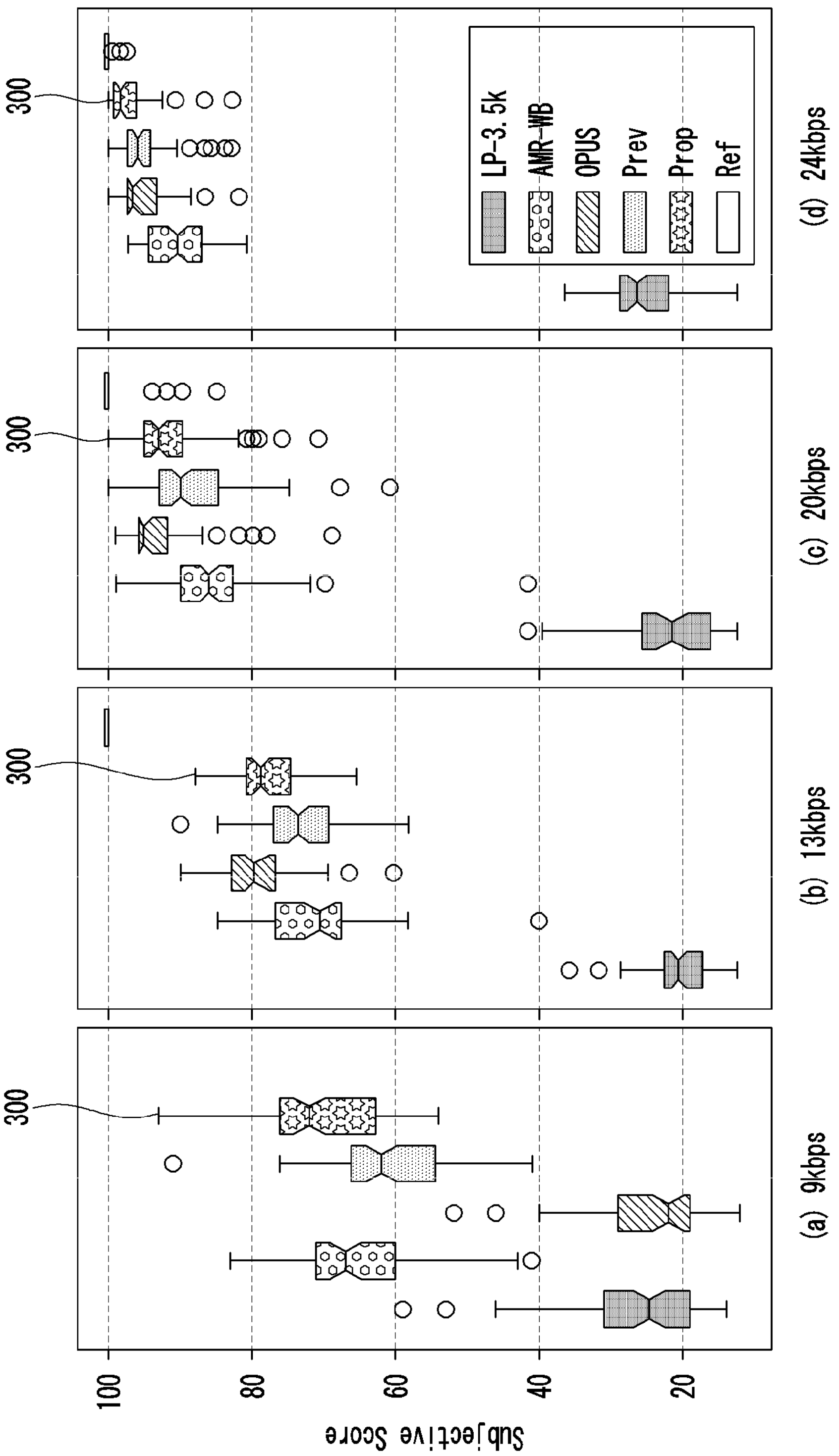
FIG. 7 illustrates the subjective performance metrics achieved by the deep neural network-based audio encoder according to an embodiment of the present disclosure.

A deep neural network-based audio encoder and decoder trained with the multi-time scale perceptual loss according to an embodiment of the present disclosure is capable of achieving better results in subjective quality evaluation, such as MUSHRA, compared to other deep neural network-based audio encoder and decoder systems that use commercial codecs like AMR-WB and OPUS or that do not apply the multi-time scale perceptual loss function. FIGS. 6 and 7 show the results of subjective and objective quality evaluation results.

Deep neural network-based audio encoders are structurally simpler than traditional signal processing-based audio encoders, but it is difficult to expect an improvement in perceptual quality without increasing the complexity of the network. To address this issue, techniques using perceptual loss functions based on psychoacoustic models (PAM) utilizing human auditory characteristics have been introduced. Audio encoders using perceptual loss functions based on psychoacoustic models (PAM) have effectively controlled quantization noise, but still need perceptual improvement.

FIG. 6 is a table showing objective performance metrics achieved by the deep neural network-based audio encoder according to an embodiment of the present disclosure.

FIG. 6 shows the comparison result of SNR and PESQ-WB between the encoders adopting the conventional techniques of AMR-WB, OPUS, and [9] "Development of a psychoacoustic loss function for the deep neural network (DNN)-based speech coder", Joon Byun, Seungmin Shin, Youngcheol Park, Jongmo Sung, and Seungkwon Beack, in Proceedings of the Annual Conference of the International Speech Communication Association (Interspeech), 2021, pp. 1694-1698, and the encoder proposed in the present disclosure.

It can be observed that the performance of the technique proposed in the present disclosure is particularly superior at low bit rates.

FIG. 7 illustrates the subjective performance metrics achieved by the deep neural network-based audio encoder according to an embodiment of the present disclosure.

With reference to FIG. 7, it can be observed that the deep neural network-based audio encoder according to an embodiment of the present disclosure obtained high scores in the MUSHRA test, as indicated by the graph 300, compared to conventional techniques.

With reference to FIGS. 6 and 7, the deep neural network-based audio encoder according to an embodiment of the present disclosure demonstrates superior performance in both objective and subjective metrics compared to conventional techniques, especially at low bit rates.

Figure 8:
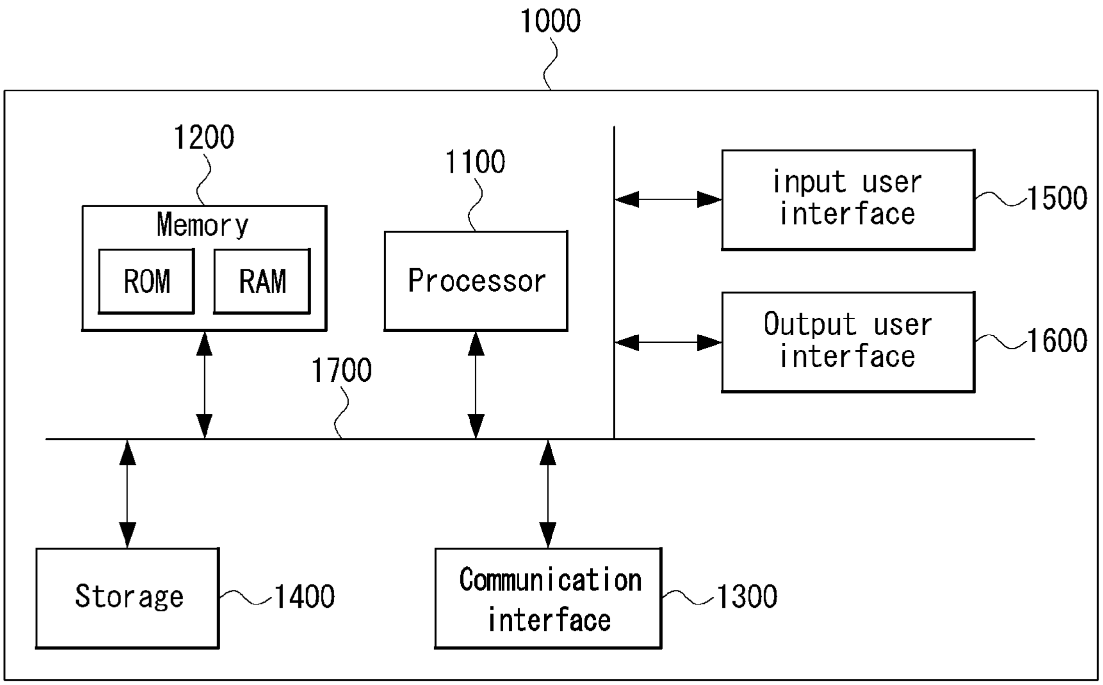
FIG. 8 is a conceptual diagram illustrating a generalized audio signal encoding and decoding apparatus or computer system capable of performing at least part of the processes of FIGS. 1 to 7.

FIG. 8 is a conceptual diagram illustrating a generalized audio signal encoding and decoding apparatus or computer system capable of performing at least part of the processes of FIGS. 1 to 7.

At least part of the audio signal processing method according to an embodiment of the present disclosure is executable by the computing system 1000 of FIG. 8.

With reference to FIG. 8, the computing system 1000 according to an embodiment of the present disclosure may include a processor 1100, a memory 1200, a communication interface 1300, a storage device 1400, an input interface 1500, an output 1600, and a bus 1700.

The computing system 1000 according to an embodiment of the present disclosure may include at least one processor 1100 and a memory 1200 storing instructions for instructing the at least one processor 1100 to perform at least one step. At least some steps of the method according to an embodiment of the present disclosure may be performed by the at least one processor 1100 loading and executing instructions from the memory 1200.

The processor 1100 may refer to a central processing unit (CPU), a graphics processing unit (GPU), or a dedicated processor on which the methods according to embodiments of the present disclosure are performed.

Each of the memory 1200 and the storage device 1400 may be configured as at least one of a volatile storage medium and a non-volatile storage medium. For example, the memory 1200 may be configured as at least one of read-only memory (ROM) and random-access memory (RAM).

Also, the computing system 1000 may include a communication interface 1300 for performing communication through a wireless network.

In addition, the computing system 1000 may further include a storage device 1400, an input interface 1500, an output interface 1600, and the like.

In addition, the components included in the computing system 1000 may each be connected to a bus 1700 to communicate with each other.

The computing system of the present disclosure may be implemented as a communicable desktop computer, a laptop computer, a notebook, a smart phone, a tablet personal computer (PC), a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, digital video recorder, digital video player, a personal digital assistant (PDA), etc.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

According to an embodiment of the present disclosure, it is advantageous to efficiently implement an audio encoder and decoder capable of achieving superior quality and clarity under the same conditions compared to using only the conventional global perceptual loss function.

According to an embodiment of the present disclosure, it is advantageous to reduce the occurrence of audible artifacts such as quantization noise and provide excellent quality even at low bit rates by extending a perceptual loss function designed based on a psychoacoustic model (PAM) to a multi-time scale and using the perceptual loss function in the training of a deep neural network-based audio encoder and decoder.

According to an embodiment of the present disclosure, it is advantageous to achieve superior quality in both objective quality assessment and subjective quality assessment compared to conventional encoding methods.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

STATEMENT REGARDING PRIOR DISCLOSURES BY THE INVENTOR OR A JOINT INVENTOR

The inventors of the present application have made related disclosure in Shin, Seung-Min et al., "Optimization of Multi-time Scale Loss Function Suitable for DNN-based Audio Coder," 2022 The Korean Institute of Broadcast and Media Engineers Summer Conference, Jun. 22, 2022 and Joon Byun et al., "Optimization of Deep Neural Network (DNN) Speech Coder Using a Multi Time Scale Perceptual Loss Function," INTERSPEECH, 2022, Sep. 22, 2022. The related disclosure was made less than one year before the effective filing date (Nov. 10, 2022) of the present application and the inventors of the present application are the same as those of the related disclosure. Accordingly, the related disclosure is disqualified as prior art under 35 USC 102(a)(1) against the present application. See 35 USC 102(b)(1)(A).

What is claimed is:

1. An audio signal processing method executed by a processor electronically communicating with a deep neural network within a computing system, the method comprising:

acquiring, by the processor, an input signal before encoding and an output signal after quantization and decoding;

calculating, by the processor, a perceptual global loss for a frame corresponding to the input and the output signals;

acquiring, by the processor, a plurality of subframes corresponding to the input and output signals by applying a windowing function to the frame of the input and output signals;

calculating, by the processor, perceptual local losses for the plurality of subframes corresponding to the input and output signals;

acquiring, by the processor, multi-time scale perceptual loss based on the perceptual global and local losses; and controlling, by the processor, an encoder based on the deep neural network to encode the input signal, wherein the controlling of the encoder comprises:

controlling, by the processor, the encoder to pass the input signal through a first gated linear unit (GLU) block within the encoder;

downsampling, by the processor, the signal passed through the first GLU block; and controlling, by the processor, the encoder to pass the downsampled signal through a second GLU block; and controlling, by the processor, the encoder to generate a latent vector through a first long-short term memory (LSTM) block based on the signal passed through the second GLU block.

2. The method of claim 1, further comprising:

quantizing, by the processor, the encoded signal; and controlling, by the processor, a decoder based on a second deep neural network to decode the quantized signal.

3. The method of claim 2, wherein the controlling of the decoder comprises:

controlling, by the processor, the decoder to pass the quantized signal through a second long-short term memory (LSTM) block within the decoder;

controlling, by the processor, the decoder to pass the signal passed through the second LSTM block through a third GLU block;

upsampling, by the processor, the signal passed through the third GLU block; and controlling, by the processor, the decoder to generate the output signal through a fourth GLU block based on the upsampled signal.

4. The method of claim 2, wherein the quantizing of the encoded signal comprises performing, by the processor, the quantization by applying a differentiable quantization technique to the encoded signal.

5. The method of claim 1, further comprising calculating, by the processor, a total loss by applying at least one of a mean squared error (MSE) loss function, a log-mel spectrum (LMS) loss function, and the multi-time scale perceptual loss.

6. The method of claim 5, wherein the calculating of the total loss comprises applying a loss function calculation module comprising a weighted sum of the perceptual global loss and the perceptual local losses, wherein the loss function calculation module further comprises a weighted sum including at least one of a loss term for controlling a bit rate using entropy, or mean squared error loss terms.

7. The method of claim 1, wherein the acquiring of the multi-time scale perceptual loss comprises acquiring the multi-time scale perceptual loss using a weighted sum of the perceptual global and local losses.

8. The method of claim 1, wherein the calculating of the perceptual global loss comprises acquiring, by the processor, the perceptual global loss by inputting the frame corresponding to the input and output signals to a loss function calculation module, and the calculating of the perceptual local losses comprises acquiring, by the processor, the perceptual local losses by inputting the plurality of subframes corresponding to the input and output signals to the loss function calculation module.

9. An audio signal processing apparatus comprising:

a processor electronically communicating with a deep neural network, wherein the processor is configured to:

acquire an input signal before encoding and an output signal after quantization and decoding;

calculate a perceptual global loss for a frame corresponding to the input and the output signals;

acquire a plurality of subframes corresponding to the input and output signals by applying a windowing function to the frame of the input and output signals;

calculate perceptual local losses for the plurality of subframes corresponding to the input and output signals;

acquire multi-time scale perceptual loss based on the perceptual global and local losses, and control an encoder based on the deep neural network to encode the input signal, wherein the processor is further configured to:

control the encoder to pass the input signal through a first gated linear unit (GLU) block within the encoder;

downsample the signal passed through the first GLU block;

control the encoder to pass the downsampled signal through a second GLU block; and control the encoder to generate a latent vector through a first long-short term memory (LSTM) block based on the signal passed through the second GLU block.

10. The audio signal processing apparatus of claim 9, wherein the processor is further configured to quantize the encoded signal and control a decoder based on a second deep neural network to decode the quantized signal.

11. The audio signal processing apparatus of claim 10, wherein the processor is further configured to:

control the decoder to pass the quantized signal through a second long-short term memory (LSTM) block within the decoder;

control the decoder to pass the signal passed through the second LSTM block through a third GLU block;

upsample the signal passed through the third GLU block; and control the decoder to generate the output signal through a fourth GLU block based on the upsampled signal.

12. The audio signal processing apparatus of claim 10, wherein the processor is further configured to perform the quantization by applying a differentiable quantization technique to the encoded signal.

13. The audio signal processing apparatus of claim 9, wherein the processor is further configured to calculate a total loss by applying at least one of a mean squared error (MSE) loss function, a log-mel spectrum (LMS) loss function, and the multi-time scale perceptual loss.

14. The audio signal processing apparatus of claim 13, wherein the processor is further configured to apply a loss function calculation module comprising a weighted sum of the perceptual global loss and the perceptual local losses, wherein the loss function calculation module further comprises a weighted sum including at least one of a loss term for controlling a bit rate using entropy, or mean squared error loss terms.

15. The audio signal processing apparatus of claim 9, wherein the processor is further configured to acquire the multi-time scale perceptual loss using a weighted sum of the perceptual global and local losses.

16. The audio signal processing apparatus of claim 9, wherein the processor is further configured to:

acquire the perceptual global loss by inputting the frame corresponding to the input and output signals to a loss function calculation module; and acquire the perceptual local losses by inputting the plurality of subframes corresponding to the input and output signals to the loss function calculation module.

17. An audio signal processing method executed by a processor in a computing system including an encoder, a decoder, and a deep neural network, the method comprising:

acquiring, by the processor, an input signal before encoding and an output signal after quantization and decoding;

calculating, by the processor, a perceptual global loss for a frame corresponding to the input and the output signals;

acquiring, by the processor, a plurality of subframes corresponding to the input and output signals by applying a windowing function to the frame of the input and output signals;

calculating, by the processor, perceptual local losses for the plurality of subframes corresponding to the input and output signals;

acquiring, by the processor, a multi-time scale perceptual loss based on the perceptual global and local losses;

controlling, by the processor, an encoder to pass the input signal through a first gated linear unit (GLU) block within the encoder;

downsampling, by the processor, the signal passed through the first GLU block;

controlling, by the processor, the encoder to pass the downsampled signal through a second GLU block; and controlling, by the processor, the encoder to generate a latent vector through a first long-short-term memory (LSTM) block based on the signal passed through the second GLU block.

18. The method of claim 17, further comprising:

controlling, by the processor, the encoder to encode the input signal using the deep neural network.

* * * * *